(12) United States Patent
Rodriguez Bravo

(10) Patent No.: US 10,922,496 B2
(45) Date of Patent: Feb. 16, 2021

(54) MODIFIED GRAPHICAL USER INTERFACE-BASED LANGUAGE LEARNING

(71) Applicant: INTERNATIONAL BUSINESS MACHINES CORPORATION, Armonk, NY (US)

(72) Inventor: Cesar Augusto Rodriguez Bravo, Alajuela (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/183,053

(22) Filed: Nov. 7, 2018

(65) Prior Publication Data

US 2020/0142964 A1 May 7, 2020

(51) Int. Cl.
*G06F 40/58* (2020.01)
*G06F 3/0481* (2013.01)
*G06F 3/0484* (2013.01)

(52) U.S. Cl.
CPC ............ *G06F 40/58* (2020.01); *G06F 3/0481* (2013.01); *G06F 3/0484* (2013.01)

(58) Field of Classification Search
CPC ....... G06F 40/58; G06F 3/0481; G06F 3/0484
See application file for complete search history.

(56) References Cited

U.S. PATENT DOCUMENTS

| | | |
|---|---|---|
| 4,791,587 A | 12/1988 | Doi |
| 4,800,522 A | 1/1989 | Miyao et al. |
| 5,652,896 A | 7/1997 | Yamauchi et al. |
| 6,182,027 B1 | 1/2001 | Nasukawa et al. |
| 6,341,958 B1 | 1/2002 | Zilberman |

(Continued)

FOREIGN PATENT DOCUMENTS

WO 2016018195 A1 2/2016

OTHER PUBLICATIONS

Faes, F., "How's 2,844% for Growth? Language Service Providers Make Inc. 5000 List". Aug. 8, 2016, 2 pgs. Retrieved on Jun. 12, 2018 from the Internet URL: <https://slator.com/industry-news/hows-2844-growth-language-service-providers-make-inc-5000-list/>.

(Continued)

*Primary Examiner* — Stella Higgs
(74) *Attorney, Agent, or Firm* — William Hartwell; Matthew M. Hulihan; Heslin Rothenberg Farley & Mesiti PC

(57) ABSTRACT

Modified graphical user interface (GUI) language learning includes establishing a user language learning profile, for a user, which indicates language learning preferences and user competency in understanding words of a target natural language, building and displaying, for the user, a modified GUI in which OS GUI elements of the modified GUI provide translated text in the target natural language, which is translated from the source natural language, and increasing, over a specified interval, and based on the user profile, a number of OS GUI elements of the initial GUI for which OS GUI elements of the modified GUI are built and displayed to provide translated text in the target natural language that is translated from text in the source natural language.

17 Claims, 9 Drawing Sheets

(56) References Cited

U.S. PATENT DOCUMENTS

| | | | |
|---|---|---|---|
| 6,396,515 B1* | 5/2002 | Hetherington | G06F 9/454 715/762 |
| 6,438,515 B1 | 8/2002 | Crawford et al. | |
| 6,535,842 B1 | 3/2003 | Roche et al. | |
| 6,993,471 B1 | 1/2006 | Flanagan et al. | |
| 7,052,278 B2 | 5/2006 | Johnson et al. | |
| 7,383,542 B2 | 6/2008 | Richardson et al. | |
| 7,620,894 B1* | 11/2009 | Kahn | G06F 3/0481 715/707 |
| 2003/0040899 A1* | 2/2003 | Ogilvie | G09B 19/06 704/2 |
| 2005/0255431 A1 | 11/2005 | Baker | |
| 2008/0148150 A1* | 6/2008 | Mall | G06F 3/048 715/707 |
| 2010/0318743 A1* | 12/2010 | Fitzpatrick | G06F 9/454 711/126 |
| 2011/0097693 A1 | 4/2011 | Crawford | |
| 2013/0090914 A1* | 4/2013 | White | G09B 19/06 704/2 |
| 2013/0159228 A1* | 6/2013 | Meijer | G06F 21/316 706/14 |
| 2015/0010889 A1 | 1/2015 | Wee | |
| 2017/0060853 A1 | 3/2017 | Lee et al. | |

OTHER PUBLICATIONS

Ava Seave, A., "In the Language of Online Language Learning Programs, Who Is Winning?", Forbes, Sep. 23, 2016, 3 pgs. Retrieved on Jun. 12, 2018 from the Internet URL: <https://www.forbes.com/sites/avaseave/2016/09/23/in-the-battle-of-online-language-learning-programswho-is-winning/#7a2cf0d1578b>.

@Ronwinbeta, "Microsoft: US workers spend 7 hours on the computer a day on average", ONMSFT, Aug. 18, 2013, 6 pgs. Retrieved on Jun. 12, 2018 from the Internet URL: <https://www.onmsft.com/news/microsoft-us-workers-spend-7-hours-computer-day-average>.

Mell, Peter, et al., "The NIST Definition of Cloud Computing", NIST Special Publication 800-145, Sep. 2011, Gaithersburg, MD, 7 pgs.

\* cited by examiner

MODIFIED GRAPHICAL USER INTERFACE-BASED LANGUAGE LEARNING

BACKGROUND

An increased desire among individuals and employees of companies with global reach to learn new languages has driven an increase in demand for language learning offerings in order to develop multi-lingual skills. However, traditional approaches to language learning are time-consuming.

SUMMARY

Shortcomings of the prior art are overcome and additional advantages are provided through a computer-implemented method. The method establishes a user language learning profile for a user. The user language learning profile indicates language learning preferences and user competency in understanding words of a target natural language. Based on text provided by operating system graphical user interface (GUI) elements of an initial GUI of an operating system (OS) being in a source natural language, the method builds and displays, for the user, a modified GUI in which OS GUI elements of the modified GUI provide translated text in the target natural language. The translated text is translated from the text in the source natural language. An OS GUI element, of the OS GUI elements of the modified GUI, includes a label for an interactive OS GUI element. The label replaces text in the source natural language displayed on the interactive GUI element in the initial GUI with translated text in the target natural language displayed on the interactive GUI element in the modified GUI. The method also increases, over a specified interval, and based on the user profile, a number of OS GUI elements of the initial GUI for which OS GUI elements of the modified GUI are built and displayed to provide translated text in the target natural language that is translated from text in the source natural language.

Further, a computer system is provided that includes a memory and a processor in communication with the memory, wherein the computer system is configured to perform a method. The method establishes a user language learning profile for a user. The user language learning profile indicates language learning preferences and user competency in understanding words of a target natural language. Based on text provided by operating system graphical user interface (GUI) elements of an initial GUI of an operating system (OS) being in a source natural language, the method builds and displays, for the user, a modified GUI in which OS GUI elements of the modified GUI provide translated text in the target natural language. The translated text is translated from the text in the source natural language. An OS GUI element, of the OS GUI elements of the modified GUI, includes a label for an interactive OS GUI element. The label replaces text in the source natural language displayed on the interactive GUI element in the initial GUI with translated text in the target natural language displayed on the interactive GUI element in the modified GUI. The method also increases, over a specified interval, and based on the user profile, a number of OS GUI elements of the initial GUI for which OS GUI elements of the modified GUI are built and displayed to provide translated text in the target natural language that is translated from text in the source natural language.

Yet further, a computer program product including a computer readable storage medium readable by a processing circuit and storing instructions for execution by the processing circuit is provided for performing a method. The method establishes a user language learning profile for a user. The user language learning profile indicates language learning preferences and user competency in understanding words of a target natural language. Based on text provided by operating system graphical user interface (GUI) elements of an initial GUI of an operating system (OS) being in a source natural language, the method builds and displays, for the user, a modified GUI in which OS GUI elements of the modified GUI provide translated text in the target natural language. The translated text is translated from the text in the source natural language. An OS GUI element, of the OS GUI elements of the modified GUI, includes a label for an interactive OS GUI element. The label replaces text in the source natural language displayed on the interactive GUI element in the initial GUI with translated text in the target natural language displayed on the interactive GUI element in the modified GUI. The method also increases, over a specified interval, and based on the user profile, a number of OS GUI elements of the initial GUI for which OS GUI elements of the modified GUI are built and displayed to provide translated text in the target natural language that is translated from text in the source natural language.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
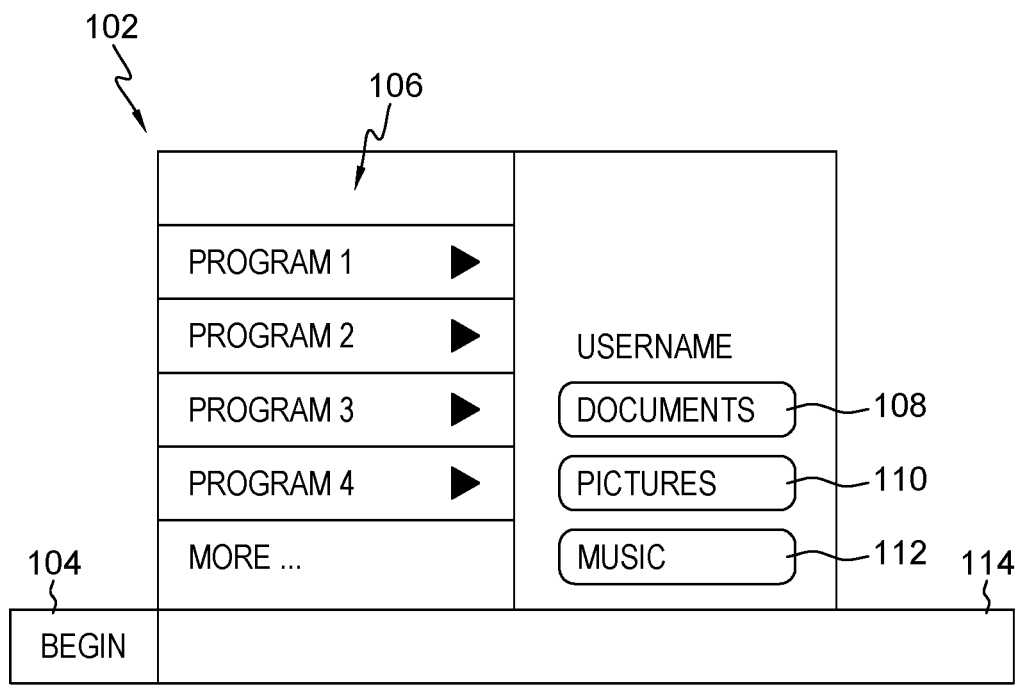
FIG. 1A depicts an example initial operating system graphical user interface (GUI)

Described herein are approaches for modified graphical user interface-based language learning, in which computer systems modify graphical user interfaces (GUI) presented to users. This enables the users to learn a language by exploiting repetition, correlation, and other principles that attach to user interaction with their computer devices. Translated words and text are presented to a user in a modified GUI and in accordance with options informed by a user profile and other relevant settings. A user language learning profile is established and maintained for a given user. The profile can indicate language learning preferences—that is preferences that apply to the user in connection with the user's learning a target natural language. Translations of text appearing in a GUI are made from a source natural language into the target natural language that the user desires to learn. The profile can also track and indicate user competency in understanding words, phrases, and any other text of the target natural language. For instance, the profile can provide a structure for the system to track how the user is performing on an ongoing basis during target language learning. It can track which text the user has previously seen and with what frequency, which translations give the user difficulty, which translations the user understands well, and so on. The profile can also store any other information that can be used in determining what to translate and when, for instance user interests, types of GUI elements to translate, and windows of time that inform the extent (frequency, number of items, word/phrase complexity, etc.) to which translated text is to be injected into the GUI.

Paper-based language learning training typically involves textbook or workbook-based exercises and quizzes that require the user's undivided attention. Audio-based language learning involves the user listening to language learning training. These traditional methods can be time-consuming. And although the audio method allows the individual to simultaneously perform other activities, such as driving a car or sleeping, this may detract user attention from learning effectively. Additionally, the user is not seeing translated text in the audio-based approach. Users retention of the learning in these methods can be very low.

Individuals can spend hours each day on their computers between work and personal activities. Meanwhile, users tend to be familiar with text associated with GUI elements, especially common GUI elements placed as part of the operating system's native GUI and/or part of the GUI for commonly-used applications. This presents an opportunity to train users as they interact with their computer, providing a persistent and effective, yet casual and noninvasive approach to language learning. Training in this manner can allow users to learn at least some of a target natural language in a short amount of time and with less effort.

Some aspects described herein can manipulate (i.e. takeover, hook-into, replace, reconfigure, etc.) the operating system (OS) GUI or portions thereof to change some labels and other text elements initially in a source natural language to text in the desired target natural language. Some OSs have common library options (offered through an SDK for instance) on which software developed to run on that OS relies in the form of calls to a standard OS library for labels and other OS GUI elements. In one example, the library is changed to replace initial (source language) text with translated text so that any calls for those elements will display the translated text in the modified GUI. Additionally or alternatively, GUI modifications could be implemented using GUI element overlays that overlay original elements of the initial GUI with elements that include translated text.

Text provided by GUI elements of the OS's GUI in a source (i.e. original, initial, native) natural language can be translated for provision as part of a modified GUI. The modified GUI can be built and displayed for the user. The modified GUI can include GUI elements, such as buttons, pop-ups, overlays, labels, or any other GUI element providing translated text in the target natural language. The translated text can be translated from the text in the source natural language. Thus, the OS GUI elements in the modified GUI, such as an interactive menu, button, or dialog box that is part of the OS's native GUI, can include a label with translated text that replaces a label with text in the source natural language.

The particular text to translate is selected based on any of various factors. In some approaches, translations can initially focus on changing the most common used/displayed items. The most commonly displayed and/or used OS GUI elements of the initial GUI can be identified beforehand or dynamically as the user uses the computer. Thus, the OS GUI elements of the initial GUI for which to build the OS GUI elements of the modified GUI are selected, and this can be based at least in part on identifying the OS GUI elements, of the initial GUI, with which the user most commonly interacts and/or which are the most commonly displayed OS GUI elements of the initial GUI.

For instance, in the Windows® line of operating systems (offered by Microsoft Corporation, Redmond, Wash., USA, of which WINDOWS is a registered trademark), the Start menu button is typically a persistent GUI element having a text label ("Start") which may be a candidate for translation. Common sub-elements include the "Run", "Pictures", "Documents", and "All Programs". In this case the source natural language is English. In an example where the target natural language is Spanish, this text (words/phrases) could be translated to "Ejecutar" (for the English "Run"), "Imágenes" (for the English "Pictures"), "Documentos" (for the English "Documents") and "Todos los Programas" (for the English "All Programs").

Figure 1B:
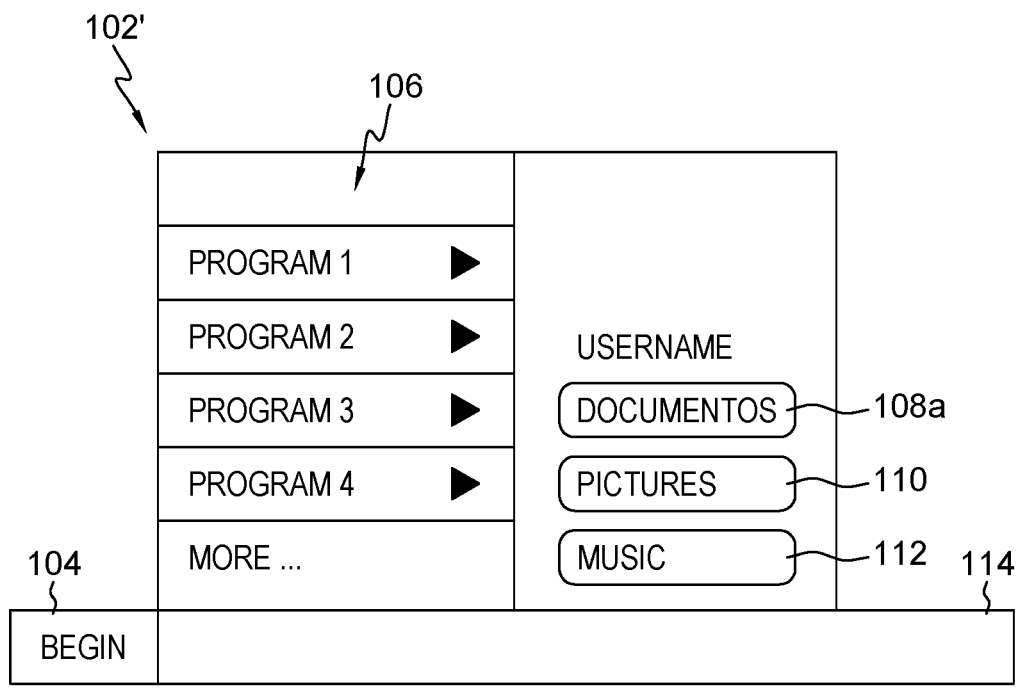
FIG. 1B depicts an example modified GUI based on the initial OS GUI of FIG. 1A, in accordance with aspects described herein.

FIG. 1A depicts an initial OS GUI and FIG. 1B depicts an example modified GUI based on the initial OS GUI of FIG. 1A, in accordance with aspects described herein. Referring initially to FIG. 1A, OS GUI elements include Begin button 104, taskbar 114, and Begin menu 102, which includes a list 106 of buttons to load various programs, and buttons 108, 110 and 112 to load the user's Documents, Pictures, and Music folders, respectively. Begin menu 102 pops up based on a user selecting the Begin button 104. "OS GUI" refers to the GUI/elements native to the operating system of the computer, as opposed to elements provided, defined, arranged, etc. by individual applications that may run on the OS.

FIG. 1B depicts a modified GUI based on the initial OS GUI of FIG. 1A. The modified GUI includes the same Begin button 104 and taskbar 114. The Begin menu 102' of the modified GUI also includes the list 106 and buttons 110 and 112. Here, however, the text label for the documents button 108 (FIG. 1A) has been translated and provided in its Spanish language equivalent ("Documentos") for button 108a, linking to the user's Documents folder.

The user may have become familiar over time with the placement of the prior Documents button 108 and what that button refers to (documents). Translating the text from Documents to Documentos leverages the user's strong, existing association between that element and the meaning of it (documents) to instill an almost automatic association for the user between the Spanish word Documentos and the English-language equivalent with which the user is already familiar.

In this example, only one GUI element has been changed. However, the number of OS GUI elements for which modified GUI elements are built and displayed can increase over time and according to any desired plan. This can be increased over a specified interval (for instance a time frame, a number of desktop sessions, a number of user interactions with various GUI elements, or any other interval), and based on the user profile which can indicate the interval and progress through the interval, e.g. be used in ascertaining whether the interval it met. For instance, the profile can indicate when user competency with the present translations increases to a level or threshold to trigger increasing the number of translated elements and/or increasing the difficulty of the words or phrases being translated.

Initially, the system can change text that is provided natively by the OS GUI (e.g. labels on common menus, dialog boxes, messages, tooltips, etc.). Additionally or alternatively, the system can translate any other text or labels, application menus, application options, and so on as part of the building and displaying the modified GUI.

FIGS. 2A-2I depict example GUI elements of a modified GUI, in accordance with aspects described herein.

Figure 2A:
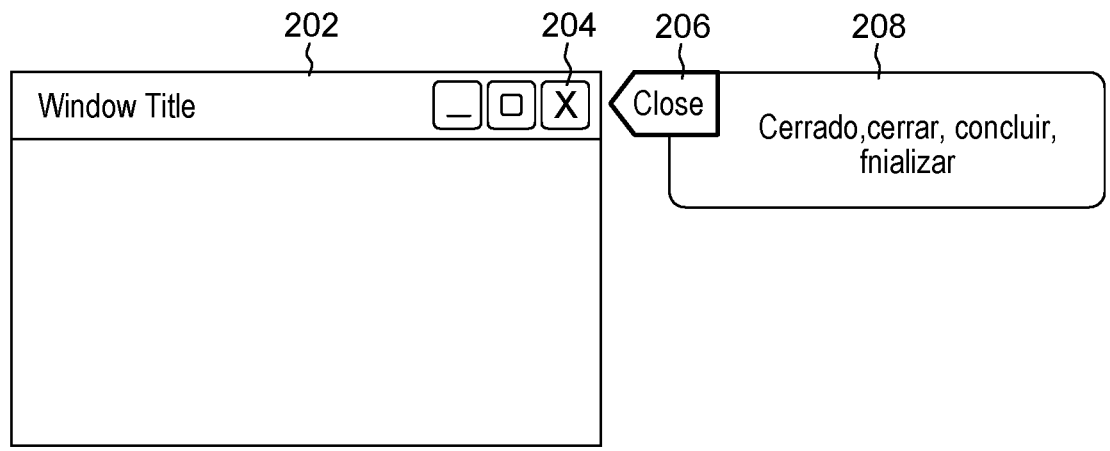
FIGS. 2A-2I depict example GUI elements of a modified GUI, in accordance with aspects described herein.

In FIG. 2A, element 202 is a window titled Window Title and having common minimize, maximize and close buttons. Close button 204 includes an X. When the user hovers a cursor (mouse pointer) over close button 206, the OS natively presents an English-language pop-op element 206 labeled "Close". In accordance with aspects described herein, the modified GUI could add element 208 containing the Spanish language translation of "Close" (i.e. 'cerrado') together with synonyms to the word "Close", i.e. cerrar, concluir, and finalizer.

Figure 2B:
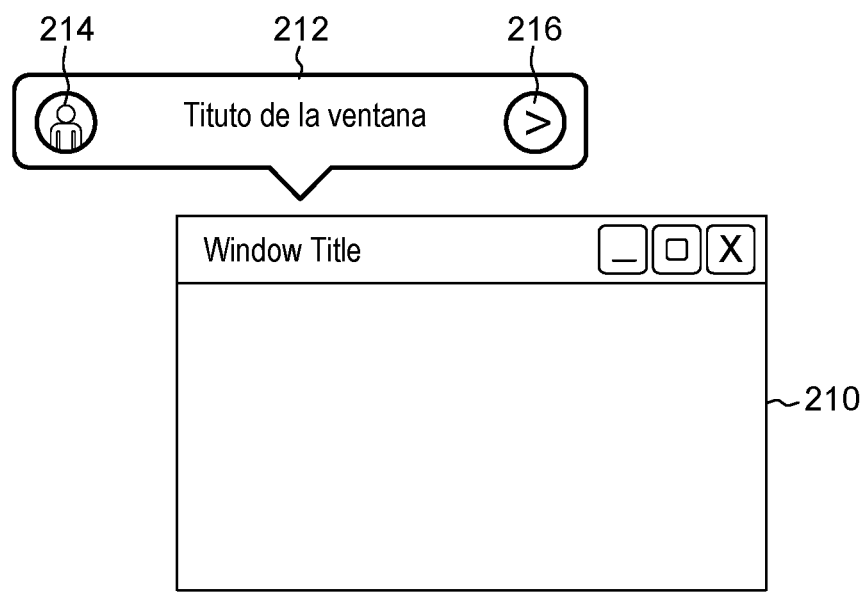

In FIG. 2B, element 210 is a window having the same title "Window Title". The user hovers the mouse over the title bar of window 210, and an OS GUI element of the modified GUI pops up to display with a translation. Pop-up element 212 includes translated text "Titulo de la Ventana" (for "Window Title"). The user can invoke related actions by clicking either of buttons 214 and 216 in the pop-up. Button 214 can link to the user's language profile, for instance to view options or make adjustments, such as an adjustment related to this translation, for instance that the user wishes to permanentize the translation of Window Title, or that the use prefers this never to be translated. Button 216 can invoke an action by the OS or other software to play audio of the pronunciation of the Spanish text.

Figure 2C:
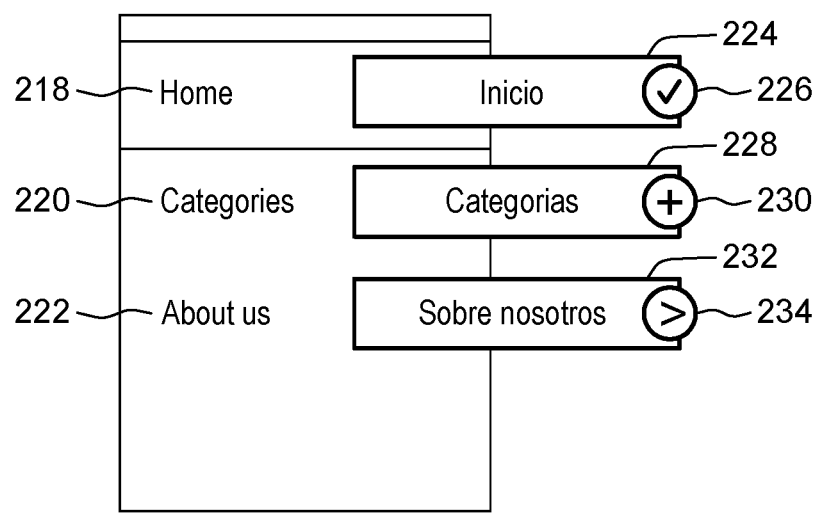

FIG. 2C presents another possibility for an interface having Home 218, Categories 220, and About Us 222 menu items, which items might be selectable. Aspects described herein can build and display additional GUI elements 224, 228 and 232 with respective translations of the text of elements 218, 220, and 222. Check button 226 can be an indicator of how proficient the user is with that translation, for instance based on having been presented to the user a threshold number of times and/or the user having demonstrated proficiency in correctly interacting with an element with that label to reach the 'Home' interface a threshold number of times. Plus button 230, when selected, can expand another pop-up element showing synonyms of the word "categorias", and button 234 can, as above, invoke an action by the OS or other software to play audio of the pronunciation of the Spanish text "Sobre nosotros".

Figure 2D:

FIG. 2D presents an example mobile OS GUI element 236 which is an Alert-style notification. There is a message label and dialog content with two buttons 238 and 240, each with a respective label. Button 238 includes a label with English language text "OK" for the initial OS GUI element. Button 240 is an element of the modified GUI, with text label "Cancelar" in place of the English-language "Cancel" of the initial OS GUI.

Figure 2E:
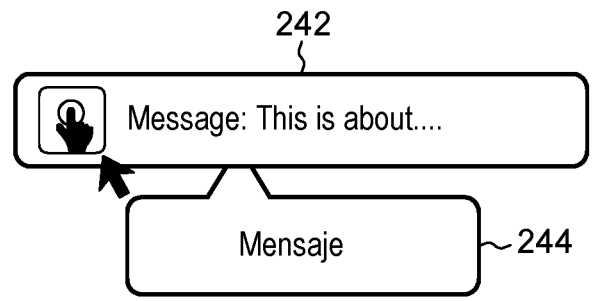

FIG. 2E shows the cursor hovering over OS GUI element 242 to cause a pop-up 244 with the Spanish word "Mensaje" as a translation of the underlying English word "Message".

Figure 2F:
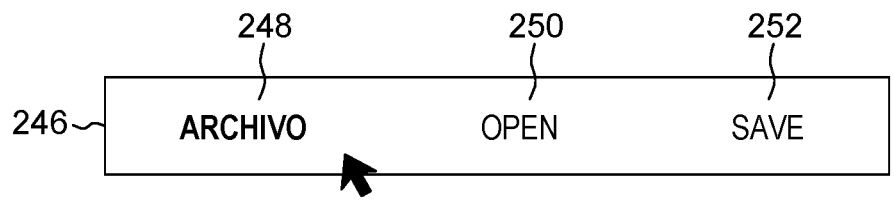

FIG. 2F depicts an example where the initial OS GUI element 246 includes a menu with Archive, Open, and Save options. Here, the user has hovered over the File menu element to cause an overlay which displays the Spanish translation of "File", i.e. "Archivo". This enables the user to correctly locate the menu item in English but see the Spanish translation after hovering over the element but just before clicking on the item.

Figure 2G:
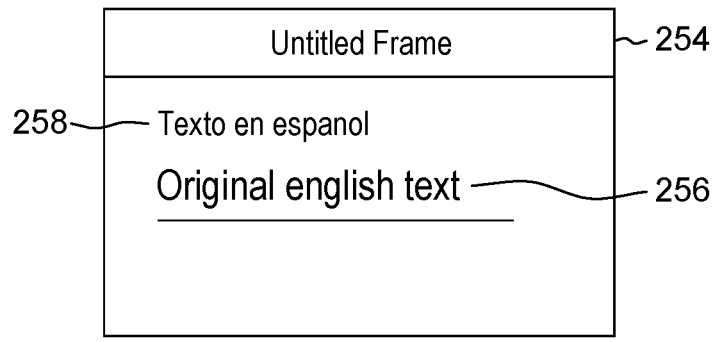

FIG. 2G depicts a frame GUI element 254 that has "Original english text" 256. The modified version of this GUI, shown in FIG. 2G, imposes the translation "Texto en español" label 258 within the frame 254.

Figure 2H:
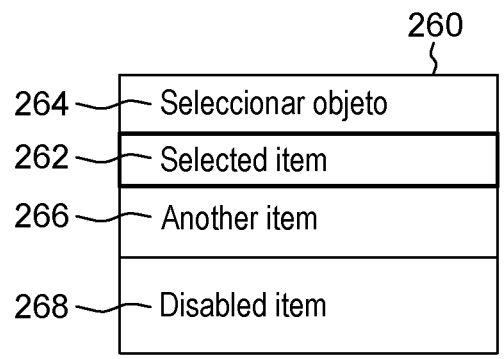

FIG. 2H shows a box element 260 with several items 262, 266 and 268 listed vertically. Here, the user has selected item 262, labeled "Selected item", which causes the modified GUI to present element 264 with translated text "Seleccionar objeto", which is the translated version of the text on selected item 262. If the user selected the another item 266, for instance by hovering over element 266 or clicking on it, the translation provided in element 264 would switch to "Otro objeto".

Figure 2I:
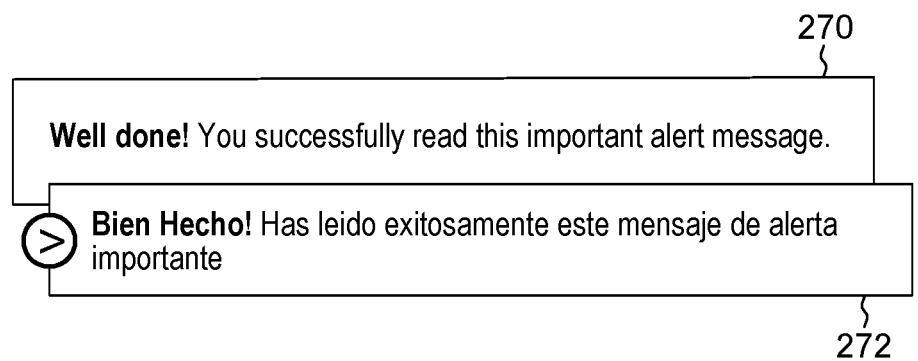

FIG. 2I depicts another example in which interface element 270 displays a message, and the modification made to the GUI imposes a pop-up box 272 with the message translated into Spanish.

Some aspects can leverage online language translator(s), such as a language translation service to deliver translations based on API calls. In one example, software running on the user's computer makes these calls over the internet to retrieve translations. Additionally or alternatively, natural language understanding and/or natural language classification, which can also be accessed via an online service, can identify context in which words or phrases are used, which can inform the proper translations. In this regard, sometimes translating phrases word-for-word misses subtle context that can affect whether the translation is accurate. Thus, building and displaying an element, of the modified GUI, that corresponds to an OS GUI element of the initial GUI (i.e. replacing it, accompanying it, etc.) can use a natural language classifier to classify a context in which the initial source-language text of the OS GUI element of the initial GUI appears. The context can inform a translator how the text is to be properly translated into the target language. Different classification of contexts for common (same) text, can result in different translated text.

In some embodiments, the foreign language text can be read to the user to help the user learn pronunciation of translated text.

In some embodiments, speech to text facilities are leveraged to convert spoken source language words/phrases into translated text form for provision in GUI elements of the modified GUI.

As noted, the number or amount of translated text can increase over time. In one approach, this number of translated items is changed according to a predetermined pattern or schedule that is based on user goals for, e.g., a number of translated OS GUI elements of the initial GUI. For example, the predetermined schedule can indicate that a particular number of new items should be translated per week.

In some approaches, the user is provided an option to maintain a given OS GUI element, of the OS GUI elements of the modified GUI, that provides translated text in the target natural language. For instance, the user can indicate that a translation is to remain persistent any time the underlying GUI element of the initial OS GUI is to be presented. Similarly, the user may be given an option to remove/rollback a given OS GUI element, of the OS GUI elements of the modified GUI, that provides translated text in the target natural language.

In some embodiments, given translated text is automatically persisted if a predefined number of times that the given text or associated element (button, checkbox, etc.) was selected/used by the user exceeds a threshold. This can be tracked and maintained in the user profile. In this example, the system maintains, in the built and displayed modified GUI, a given OS GUI element, of the OS GUI elements of the modified GUI, for which user interaction with the given OS element exceeds a predefined threshold, such as a number of times, and/or an amount of time spent interacting with the element.

As an enhancement, a hint (such as a bubble) containing the source text could be displayed if the user hovers the mouse over given translated text within a predetermined amount of time (e.g. 5 or 10 seconds as an example) after displaying the translated text in the modified GUI.

Additionally or alternatively, the system can change given text of an element between the source and target languages on a regular interval. Thus, displaying an OS GUI element, of the OS GUI elements of the modified GUI, can include fading back and forth between (i) an OS GUI element, of the initial GUI, providing text in the source natural language and (ii) the given OS GUI element that is to replace the OS GUI element of the initial GUI. For example using FIG. 2F, the label "Archivo" could fade out to display the translated label "File" for 30 seconds, and then change back to displaying "Archivo" for an amount of time before repeating the cycle.

Any one or more of the options described may be adjusted, enabled, disabled, etc. and indicated in the user language learning profile as such. Thus, the system can be triggered to apply of these aspects as required or desired by the user.

A "listener" software can be installed on the user's computer to check the most used applications, menus, options, etc. by the given user. The listener could report these metrics, for instance within the user profile. A process running on the user's computer system or another computer system could then automatically change the text of selected elements to the desired target language. As noted, the selecting of the OS GUI elements of the initial GUI to build the OS GUI elements of the modified GUI can be made according to any desired approach, such as by identifying the elements, of the initial GUI, with which the user most commonly interacts.

Categories, such as 'junior', 'beginner', 'apprentice', 'fan', 'advanced' and others of increasing proficiency can be preconfigured with a given number of changes associated therewith. For example, the 'junior' category might change two text/menu items from the most used applications, while the 'fan' category might change six text/menu items from the most used applications, and the advanced category might change twenty text/menu items from the most used applications. Movement of a user between categories can be manual or automatic, i.e. a function of user specification and/or monitoring the user's progression and automatic adjustment. For example, a process could track over time the user's competency in understanding words of the target natural language. Increasing the number of translated items could include automatically changing a number of built and displayed OS GUI elements of the modified GUI according to the user competency indicated in the user profile and based on a change in the user competency.

Any type of GUI elements with text may be translated in accordance with aspects described herein. This includes, but is not limited to, menus, applications, labels, text objects, folders, and the like.

The system can be configured to determine what to change (translate), and this can be based on any desired factor(s). The competency category above (junior, beginner, etc.) can be one factor. This can also dictate which types of items, such as menus, applications objects, text objects, etc. to translate. User-triggered items, selected items, and/or types of elements can be other factors. Additionally or alternatively, a cognitive engine can inform which items to translate based on the user's progression in terms of the learning cycle and competency. This can track the user interactions over time, learning which words/phrases the user already knows, and learn from this what would most benefit the user. The user competency in understanding words of the target natural language can be tracked through, for example, tracking the user's proficiency and competency in interacting with proper OS GUI elements of the modified GUI to invoke desired tasks. In some examples, words known to be problematic for the user may be deferred for translation at later times after the user is more comfortable with the language. On the other hand, the system could take the opposite approach and focus on translating the words that do present problems for the user, in order to directly address those challenges.

In some embodiments, an emphasis is placed on translating words pertaining to particular user interest areas, for example specific topics in areas such as computer science, medicine/health care, art, or engineering. In this regard, the selection of the GUI elements of the initial GUI for which to build the OS GUI elements of the modified GUI can be based at least in part on topics that interest the user. Additionally or alternatively, the selection may be less focused on subject-matter and more focused on words or phrases that are most developmentally appropriate or age appropriate.

Figure 3:
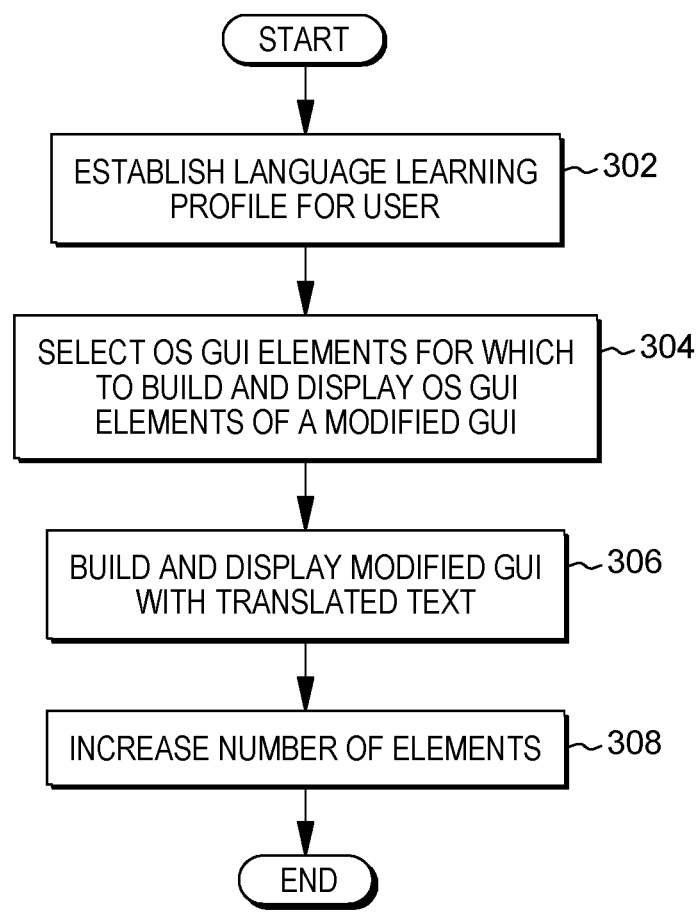
FIG. 3 depicts an example process for modified GUI based language learning, in accordance with aspects described herein.

FIG. 3 depicts an example process for modified GUI-based language learning, in accordance with aspects described herein. In some examples, the process is performed by one or more computer systems, such as those described herein, which may include one or more computer systems used by a user who is learning a target natural language, one or more cloud or remote servers, for instance ones providing translation, natural language classification, and/or cognitive capabilities to determine text to translate, and/or one or more other computer systems.

The process begins by establishing (302) a user language learning profile for a user. The user language learning profile indicates, for instance, language learning preferences and user competency in understanding words of a target natural language.

Text is provided by operating system graphical user interface (GUI) elements of an initial GUI of an operating system (OS) in a source natural language. The process selects (304) the OS GUI elements of the initial GUI for which to build the OS GUI elements of the modified GUI. The selecting can be based at least in part on identifying the OS GUI elements, of the initial GUI, with which the user most commonly interacts. Additionally or alternatively, the selecting is further based at least in part on identifying the most commonly displayed OS GUI elements of the initial GUI and/or topics that interest the user.

In some aspects, user competency in understanding words of the target natural language can be tracked by, at least in part, tracking competency of the user in interacting with proper OS GUI elements of the modified GUI to invoke desired tasks. The selection of the GUI elements for which to build other GUI elements for the modified GUI can be further based at least in part on that tracked competency of the user in interacting with proper OS GUI elements of the modified GUI.

OS GUI elements, of the OS GUI elements of the modified GUI, can be any kind of GUI elements. Examples include but are not limited to labels, pop-ups displayed based on the user hovering a cursor over a word in the source natural language, the pop-up providing a translation of the word into the target natural language, and/or a pop-up displaying synonyms, in the target natural language, for a word in the source natural language presented in the initial GUI.

Continuing with FIG. 3, the process builds and displays (306), for the user, the modified GUI in which OS GUI elements of the modified GUI provide translated text in the target natural language, the translated text being translated from the text in the source natural language. For instance, an OS GUI element, of the OS GUI elements of the modified GUI, can include a label for an interactive OS GUI element, and that label could replace text in the source natural language displayed on the interactive GUI element in the initial GUI with translated text in the target natural language displayed on the interactive GUI element in the modified GUI.

Displaying an OS GUI element, of the OS GUI elements of the modified GUI, can include fading back and forth between (i) an OS GUI element, of the initial GUI, providing text in the source natural language, and (ii) the given OS GUI element that is to replace the OS GUI element of the initial GUI, to provide translated text in the target natural language that is translated from the text provided by the OS GUI element of the initial GUI. Additionally or alternatively, the building and displaying the modified GUI can include building a given OS GUI element, of the OS GUI elements of the modified GUI, corresponding to an OS GUI element of the initial GUI, the OS GUI element of the initial GUI providing text in the source natural language. The building the given OS GUI element can include translating the text provided by the OS GUI element of the initial GUI into translated text in the target natural language, the translated text to be provided by the given OS GUI element when displayed as part of the modified GUI. In some examples, the translating includes using a natural language classifier to classify a context in which the text of the OS GUI element of the initial GUI appears, where classification of contexts in which same text is used results in different translated text.

The process of FIG. 3 continues by increasing (308), over a specified interval, and based on the user profile, a number of OS GUI elements of the initial GUI for which OS GUI elements of the modified GUI are built and displayed to provide translated text in the target natural language that is translated from text in the source natural language. This increasing can include automatically changing a number of built and displayed OS GUI elements of the modified GUI according to a predetermined schedule (timeframe, number of correct interactions, etc.) that is based on user goals for a number of translated OS GUI elements of the initial GUI. In this regard, the process can track, over time, the user competency in understanding words of the target natural language. The increasing can include automatically changing a number of built and displayed OS GUI elements of the modified GUI according to the user competency indicated in the user profile and based on a change in the user competency.

The user can also provided with option(s) to remove a given OS GUI element, of the OS GUI elements of the modified GUI, that provides translated text in the target natural language, and/or maintain a given OS GUI element, of the OS GUI elements of the modified GUI, that provides translated text in the target natural language.

In some examples, the process maintains, in the built and displayed modified GUI, a given OS GUI element, of the OS GUI elements of the modified GUI, for which user interaction with the given OS element exceeds a predefined threshold.

GUI elements other than OS GUI elements can also be the basis for building and displaying corresponding elements in the modified GUI. For instance, the building and displaying the modified GUI can also build and display, for application GUI elements of applications executing on the OS, the application GUI elements providing text in the source natural language, additional GUI elements providing translated text in the target natural language that is translated from the text, in the source natural language, provided by the application GUI elements. The method can further include increasing, over the specified interval, a number of the additional GUI elements providing translated text in the target natural language that is translated from the text provided by the application GUI elements. The application GUI elements can include application menus and/or application options, as examples.

Although various examples are provided, variations are possible without departing from a spirit of the claimed aspects.

Figure 4:
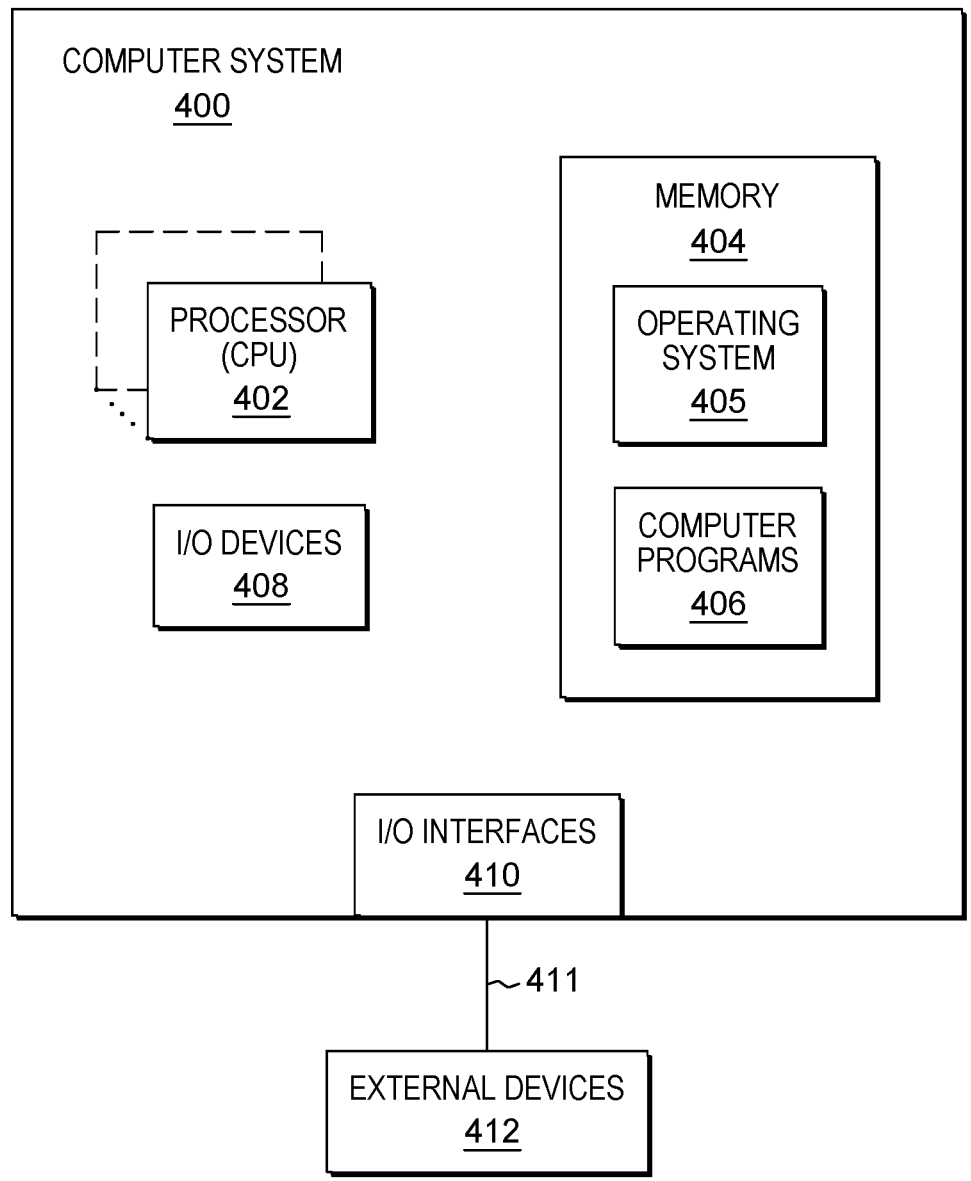
FIG. 4 depicts one example of a computer system and associated devices to incorporate and/or use aspects described herein.

Processes described herein may be performed singly or collectively by one or more computer systems, such as one or more user computing devices, remote or cloud server(s), and/or a combination of the foregoing. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
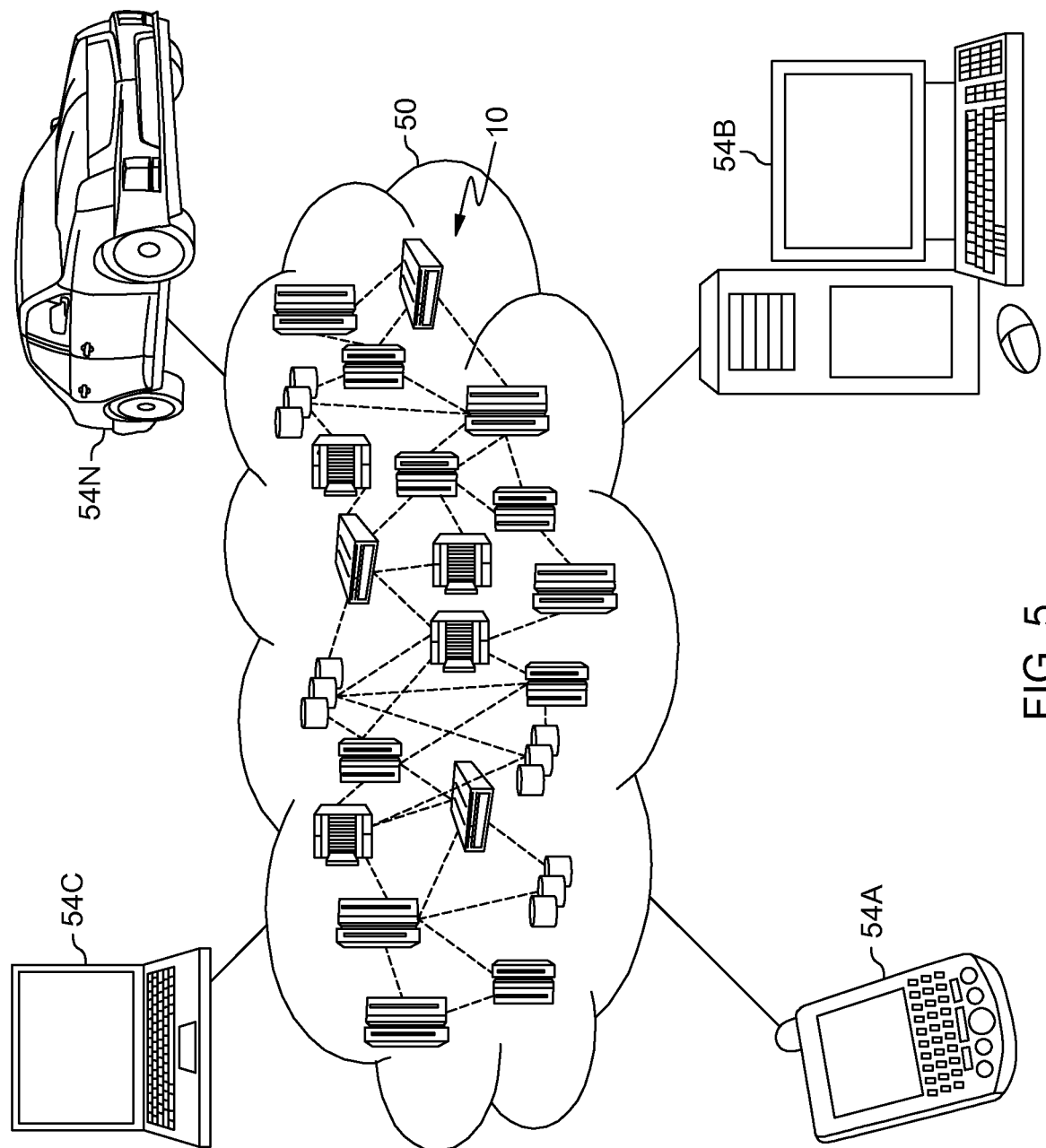
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
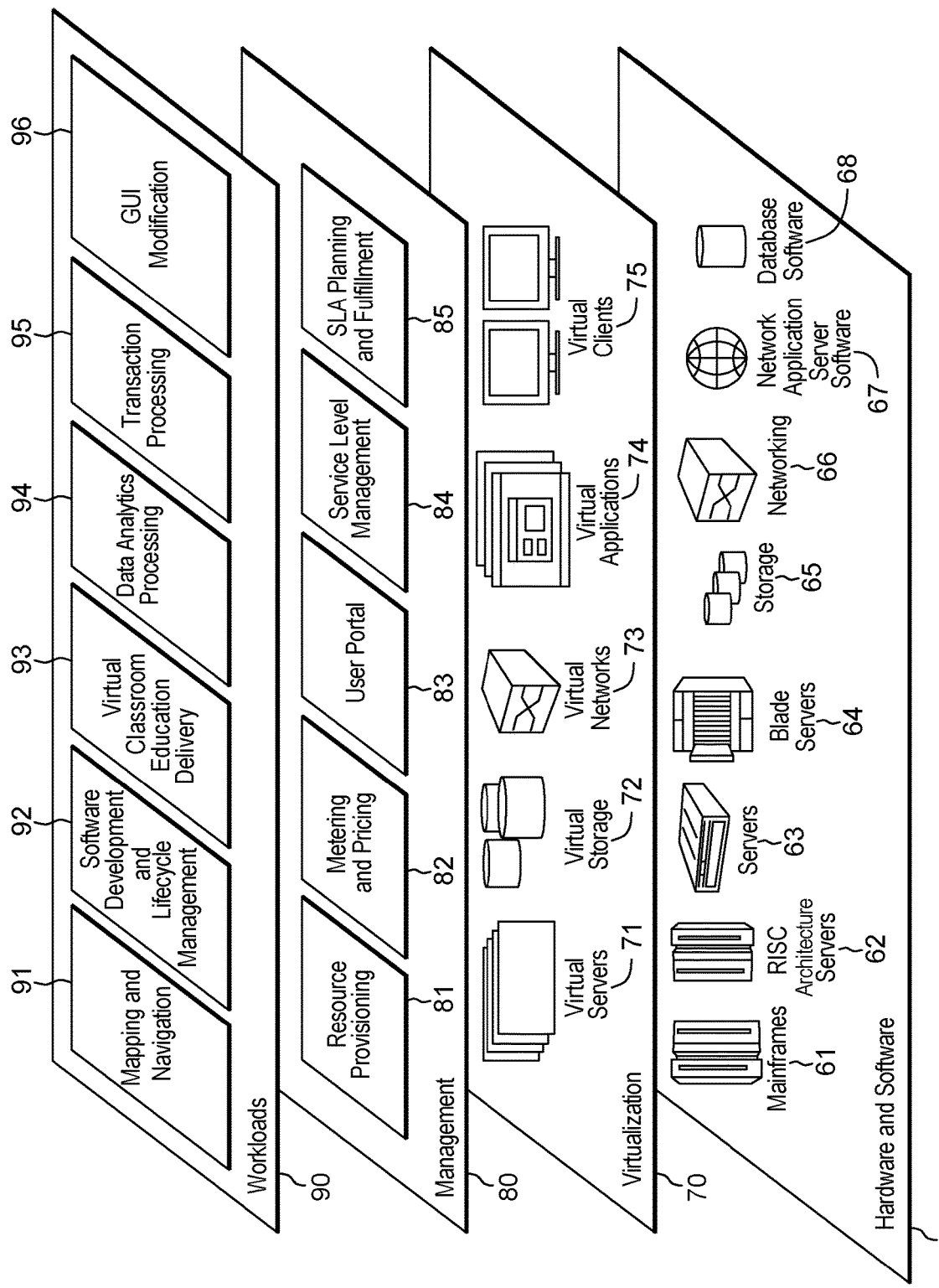
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI modification for modified GUI-based language learning 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer implemented method comprising:
   establishing a user language learning profile for a user, the user language learning profile indicating language learning preferences and user competency in understanding words of a target natural language;
   based on text provided by a plurality of operating system graphical user interface (GUI) elements of an initial GUI of an operating system (OS) being in a source natural language, building and displaying, for the user, a modified GUI in which a plurality of OS GUI elements of the modified GUI provide translated text in the target natural language, the translated text being translated from the text in the source natural language, wherein an OS GUI element, of the plurality of OS GUI elements of the modified GUI, comprises a label for an interactive OS GUI element, the label replacing text in the source natural language displayed on the interactive GUI element in the initial GUI with translated text in the target natural language displayed on the interactive GUI element in the modified GUI;
   selecting at least some of the plurality of OS GUI elements of the initial GUI for which to build at least some of the plurality of OS GUI elements of the modified GUI, wherein the modified GUI is incrementally updated over time with the at least some of the plurality of OS GUI elements of the modified GUI;
   increasing, over a specified interval, and based on the user profile, a number of OS GUI elements of the initial GUI for which a number of OS GUI elements of the modified GUI are built and displayed to provide translated text in the target natural language that is translated from text in the source natural language; and
   tracking the user competency in understanding words of the target natural language by, at least in part, tracking competency of the user in interacting with proper OS GUI elements, which are of the modified GUI and which provide translated text in the target natural language, to invoke desired tasks, wherein the selecting is based at least in part on the tracked competency of the user in interacting with the proper OS GUI elements of the modified GUI, wherein the tracking the user competency in understanding words of the target natural language by tracking competency of the user in interacting with proper OS GUI elements informs of one or more words, of the target natural language, which the user has trouble understanding, and wherein the selecting selects to build modified OS GUI elements for OS GUI elements, of the initial GUI, having labels in the source natural language that translate to those one or more words of the target natural language.

2. The method of claim 1, wherein the selecting is further based at least in part on identifying the OS GUI elements, of the initial GUI, with which the user most commonly interacts.

3. The method of claim 2, wherein the selecting is further based at least in part on identifying the most commonly displayed OS GUI elements of the initial GUI.

4. The method of claim 1, wherein the selecting is further based at least in part on topics that interest the user.

5. The method of claim 1, wherein the increasing comprises automatically changing a number of built and displayed OS GUI elements of the modified GUI according to a predetermined schedule that is based on user goals for a number of translated OS GUI elements of the initial GUI.

6. The method of claim 1, wherein the increasing comprises automatically changing a number of built and displayed OS GUI elements of the modified GUI according to the user competency indicated in the user profile and based on a change in the user competency.

7. The method of claim 1, further comprising providing to the user at least one selected from the group consisting of:
   an option to remove a given OS GUI element, of the plurality of OS GUI elements of the modified GUI, that provides translated text in the target natural language; and
   an option to maintain a given OS GUI element, of the plurality of OS GUI elements of the modified GUI, that provides translated text in the target natural language.

8. The method of claim 1, further comprising maintaining, in the built and displayed modified GUI, a given OS GUI element, of the plurality of OS GUI elements of the modified GUI, for which user interaction with the given OS element exceeds a predefined threshold.

9. The method of claim 1, wherein the building and displaying the modified GUI also builds and displays, for application GUI elements of applications executing on the OS, the application GUI elements providing text in the source natural language, additional GUI elements providing translated text in the target natural language that is translated from the text, in the source natural language, provided by the application GUI elements, and wherein the method further comprises increasing, over the specified interval, a number of the additional GUI elements providing translated text in the target natural language that is translated from the text provided by the application GUI elements, wherein the application GUI elements comprise at least one selected from the group consisting of application menus and application options.

10. The method of claim 1, wherein the displaying an OS GUI element, of the plurality of OS GUI elements of the modified GUI, comprises fading back and forth between (i) an OS GUI element, of the initial GUI, providing text in the source natural language and (ii) the given OS GUI element that is to replace the OS GUI element of the initial GUI, to provide translated text in the target natural language that is translated from the text provided by the OS GUI element of the initial GUI.

11. The method of claim 1, wherein the building and displaying the modified GUI comprises building a given OS GUI element, of the plurality of OS GUI elements of the modified GUI, corresponding to an OS GUI element of the initial GUI, the OS GUI element of the initial GUI providing text in the source natural language, and wherein the building the given OS GUI element comprises translating the text provided by the OS GUI element of the initial GUI into translated text in the target natural language, the translated text to be provided by the given OS GUI element when displayed as part of the modified GUI, and wherein the translating comprises using a natural language classifier to classify a context in which the text of the OS GUI element of the initial GUI appears, wherein different classification of contexts in which same text is used results in different translated text.

12. The method of claim 1, wherein an OS GUI element, of the plurality of OS GUI elements of the modified GUI, comprises one selected from the group consisting of:
 a pop-up displayed based on the user hovering a cursor over a word in the source natural language, the pop-up providing a translation of the word into the target natural language; and
 a pop-up displaying synonyms, in the target natural language, for a word in the source natural language presented in the initial GUI.

13. A computer system comprising:
 a memory; and
 a processor in communication with the memory, wherein the computer system is configured to perform a method comprising:
  establishing a user language learning profile for a user, the user language learning profile indicating language learning preferences and user competency in understanding words of a target natural language;
  based on text provided by a plurality of operating system graphical user interface (GUI) elements of an initial GUI of an operating system (OS) being in a source natural language, building and displaying, for the user, a modified GUI in which a plurality of OS GUI elements of the modified GUI provide translated text in the target natural language, the translated text being translated from the text in the source natural language, wherein an OS GUI element, of the plurality of OS GUI elements of the modified GUI, comprises a label for an interactive OS GUI element, the label replacing text in the source natural language displayed on the interactive GUI element in the initial GUI with translated text in the target natural language displayed on the interactive GUI element in the modified GUI;
  selecting at least some of the plurality of OS GUI elements of the initial GUI for which to build at least some of the plurality of OS GUI elements of the modified GUI, wherein the modified GUI in incrementally updated over time with the at least some of the plurality of OS GUI elements of the modified GUI;
  increasing, over a specified interval, and based on the user profile, a number of OS GUI elements of the initial GUI for which a number of OS GUI elements of the modified GUI are built and displayed to provide translated text in the target natural language that is translated from text in the source natural language; and
  tracking the user competency in understanding words of the target natural language by, at least in part, tracking competency of the user in interacting with proper OS GUI elements, which are of the modified GUI and which provide translated text in the target natural language, to invoke desired tasks, wherein the selecting is based at least in part on the tracked competency of the user in interacting with the proper OS GUI elements of the modified GUI, wherein the tracking the user competency in understanding words of the target natural language by tracking competency of the user in interacting with proper OS GUI elements informs of one or more words, of the target natural language, which the user has trouble understanding, and wherein the selecting selects to build modified OS GUI elements for OS GUI elements, of the initial GUI, having labels in the source natural language that translate to those one or more words of the target natural language.

14. The computer system of claim 13, wherein the method further comprises maintaining, in the built and displayed modified GUI, a given OS GUI element, of the plurality of OS GUI elements of the modified GUI, for which user interaction with the given OS element exceeds a predefined threshold.

15. The computer system of claim 13, wherein the building and displaying the modified GUI comprises building a given OS GUI element, of the plurality of OS GUI elements of the modified GUI, corresponding to an OS GUI element of the initial GUI, the OS GUI element of the initial GUI providing text in the source natural language, and wherein the building the given OS GUI element comprises translating the text provided by the OS GUI element of the initial GUI into translated text in the target natural language, the translated text to be provided by the given OS GUI element when displayed as part of the modified GUI, and wherein the translating comprises using a natural language classifier to classify a context in which the text of the OS GUI element of the initial GUI appears, wherein different classification of contexts in which same text is used results in different translated text.

16. A computer program product comprising:
 a computer readable storage medium readable by a processing circuit and storing instructions for execution by the processing circuit for performing a method comprising:
  establishing a user language learning profile for a user, the user language learning profile indicating language learning preferences and user competency in understanding words of a target natural language;
  based on text provided by a plurality of operating system graphical user interface (GUI) elements of an initial GUI of an operating system (OS) being in a source natural language, building and displaying, for the user, a modified GUI in which a plurality of OS GUI elements of the modified GUI provide translated text in the target natural language, the translated text being translated from the text in the source natural language, wherein an OS GUI element, of the plurality of OS GUI elements of the modified GUI, comprises a label for an interactive OS GUI element, the label replacing text in the source natural language displayed on the interactive GUI element in the initial GUI with translated text in the target natural language displayed on the interactive GUI element in the modified GUI;

selecting at least some of the plurality of OS GUI elements of the initial GUI for which to build at least some of the plurality of OS GUI elements of the modified GUI, wherein the modified GUI in incrementally updated over time with the at least some of the plurality of OS GUI elements of the modified GUI;

increasing, over a specified interval, and based on the user profile, a number of OS GUI elements of the initial GUI for which a number of OS GUI elements of the modified GUI are built and displayed to provide translated text in the target natural language that is translated from text in the source natural language; and tracking the user competency in understanding words of the target natural language by, at least in part, tracking competency of the user in interacting with proper OS GUI elements, which are of the modified GUI and which provide translated text in the target natural language, to invoke desired tasks, wherein the selecting is based at least in part on the tracked competency of the user in interacting with the proper OS GUI elements of the modified GUI, wherein the tracking the user competency in understanding words of the target natural language by tracking competency of the user in interacting with proper OS GUI elements informs of one or more words, of the target natural language, which the user has trouble understanding, and wherein the selecting selects to build modified OS GUI elements for OS GUI elements, of the initial GUI, having labels in the source natural language that translate to those one or more words of the target natural language.

17. The computer program product of claim 16, wherein the building and displaying the modified GUI comprises building a given OS GUI element, of the plurality of OS GUI elements of the modified GUI, corresponding to an OS GUI element of the initial GUI, the OS GUI element of the initial GUI providing text in the source natural language, and wherein the building the given OS GUI element comprises translating the text provided by the OS GUI element of the initial GUI into translated text in the target natural language, the translated text to be provided by the given OS GUI element when displayed as part of the modified GUI, and wherein the translating comprises using a natural language classifier to classify a context in which the text of the OS GUI element of the initial GUI appears, wherein different classification of contexts in which same text is used results in different translated text.

* * * * *